United States Patent
Yamazaki et al.

(10) Patent No.: US 9,579,991 B2
(45) Date of Patent: Feb. 28, 2017

(54) VEHICLE SYSTEM AND METHOD FOR CONTROLLING TORQUE DELIVERY DURING TRANSMISSION ENGAGEMENTS WITH ROAD GRADE AND MASS ESTIMATION

(71) Applicant: FORD GLOBAL TECHNOLOGIES, LLC, Dearborn, MI (US)

(72) Inventors: Mark Steven Yamazaki, Canton, MI (US); Hai Yu, Canton, MI (US); Bernard D. Nefcy, Novi, MI (US); Felix Nedorezov, Rochester Hills, MI (US); Wei Liang, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 14/504,489

(22) Filed: Oct. 2, 2014

(65) Prior Publication Data

US 2016/0096446 A1   Apr. 7, 2016

(51) Int. Cl.
*B60L 15/20* (2006.01)
*B60W 20/00* (2016.01)
*B60W 40/13* (2012.01)
*B60W 40/076* (2012.01)

(52) U.S. Cl.
CPC ....... *B60L 15/2081* (2013.01); *B60L 15/2054* (2013.01); *B60W 20/00* (2013.01); *B60W 40/076* (2013.01); *B60W 40/13* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 5,951,614 A * | 9/1999 | Tabata | B60K 6/48 180/65.25 |
| 6,944,532 B2 | 9/2005 | Bellinger | |
| 8,282,526 B2 | 10/2012 | Heap et al. | |
| 8,562,484 B1 | 10/2013 | Nedorezov et al. | |
| 8,571,771 B2 | 10/2013 | Kresse | |
| 8,620,498 B2 | 12/2013 | Zerbini et al. | |
| 8,793,035 B2 | 7/2014 | Yu et al. | |
| 2005/0032598 A1 * | 2/2005 | Hanyu | B60K 6/36 475/5 |
| 2006/0266569 A1 * | 11/2006 | Fujiwara | B60K 6/52 180/65.26 |
| 2009/0234549 A1 * | 9/2009 | Silveri | B60K 6/485 701/70 |
| 2010/0179714 A1 * | 7/2010 | Tani | B60K 6/445 701/22 |
| 2011/0212804 A1 * | 9/2011 | Imamura | B60K 6/365 475/150 |
| 2013/0024057 A1 | 1/2013 | Jung et al. | |
| 2013/0297106 A1 | 11/2013 | Yamazaki et al. | |

(Continued)

*Primary Examiner* — Ramya Burgess
*Assistant Examiner* — Mark Manley
(74) *Attorney, Agent, or Firm* — Carlson, Gaskey & Olds

(57) ABSTRACT

A method according to an exemplary aspect of the present disclosure includes, among other things, controlling a torque output of an electric machine of an electrified vehicle based on estimated loads present during a transmission engagement of the electrified vehicle.

18 Claims, 4 Drawing Sheets

(56) References Cited

U.S. PATENT DOCUMENTS

| | | | |
|---|---|---|---|
| 2013/0297135 A1* | 11/2013 | Yamanaka | B60K 6/48 701/22 |
| 2013/0325233 A1* | 12/2013 | Whitney | B60W 20/108 701/22 |
| 2014/0067154 A1 | 3/2014 | Yu et al. | |
| 2014/0067155 A1 | 3/2014 | Yu et al. | |
| 2014/0067240 A1 | 3/2014 | Yu | |

* cited by examiner

VEHICLE SYSTEM AND METHOD FOR CONTROLLING TORQUE DELIVERY DURING TRANSMISSION ENGAGEMENTS WITH ROAD GRADE AND MASS ESTIMATION

TECHNICAL FIELD

This disclosure relates to a vehicle system and method associated with an electrified vehicle. A torque output of an electric machine may be controlled to compensate for variations in road grade and vehicle mass during transmission engagements of the electrified vehicle.

BACKGROUND

The need to reduce fuel consumption and emissions in automobiles and other vehicles is well known. Therefore, vehicles are being developed that reduce or completely eliminate reliance on an internal combustion engine. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

Electrified vehicles typically spin down the electric machine when the vehicle is at rest to conserve energy. This can influence the efficiency of subsequent transmission engagements. For example, the transmission pump typically cannot pressurize fast enough to smoothly engage the clutches of the transmission when a shift change is subsequently requested. Although some vehicles may be equipped with auxiliary oil pumps, these pumps lack sufficient capacity to generate the pressure or flow required to perform the initial engagement/filling of the clutches of the transmission. The efficiency of transmission engagements of an electrified vehicle may also be influenced by variations in road grade and vehicle mass.

SUMMARY

A method according to an exemplary aspect of the present disclosure includes, among other things, controlling a torque output of an electric machine of an electrified vehicle based on estimated loads present during a transmission engagement of the electrified vehicle.

In a further non-limiting embodiment of the foregoing method, the controlling step is performed in response to movement of a shift device from a neutral gear to a driver gear.

In a further non-limiting embodiment of either of the forgoing methods, the controlling step includes determining whether an input shaft of a transmission gearbox is spinning or stationary as the transmission engagement is initiated.

In a further non-limiting embodiment of any of the foregoing methods, the estimated loads are based on at least a road grade estimate, a vehicle mass estimate, driveline loads, and transmission pump loads.

In a further non-limiting embodiment of any of the foregoing methods, the estimated loads are based on an amount of inertia necessary to spin up an input shaft of a transmission gearbox.

In a further non-limiting embodiment of any of the foregoing methods, the controlling step includes estimating the loads present during the transmission engagement and adjusting the torque output of the electric machine to compensate for the estimated loads.

In a further non-limiting embodiment of any of the foregoing methods, the controlling step includes determining a road grade estimate and deriving a first torque compensation value from the road grade estimate.

In a further non-limiting embodiment of any of the foregoing methods, the controlling step includes determining a vehicle mass estimate and deriving a second torque compensation value from the vehicle mass estimate.

In a further non-limiting embodiment of any of the foregoing methods, the method includes deriving a third torque compensation value from driveline losses and a fourth torque compensation value from transmission pump loads.

In a further non-limiting embodiment of any of the foregoing methods, the method includes determining a feed-forward torque by adding the first torque compensation value, the second torque compensation value, the third torque compensation value and the fourth torque compensation value.

In a further non-limiting embodiment of any of the foregoing methods, the controlling step includes modifying the torque output based on the feed-forward torque and a feedback torque.

In a further non-limiting embodiment of any of the foregoing methods, the method includes deriving a fifth torque compensation value based on an amount of inertia required to spin up an input shaft of a transmission gearbox.

In a further non-limiting embodiment of any of the foregoing methods, the method includes determining a feed-forward torque by adding the first torque compensation value, the second torque compensation value, the third torque compensation value, the fourth torque compensation value, and the fifth torque compensation value.

In a further non-limiting embodiment of any of the foregoing methods, the controlling step includes modifying the torque output based on the feed-forward torque and a feedback torque.

In a further non-limiting embodiment of any of the foregoing methods, the electrified vehicle is a modular hybrid transmission (MHT) vehicle.

A vehicle system according to another exemplary aspect of the present disclosure includes, among other things, a transmission gearbox, an electric machine that supplies torque to an input shaft of the transmission gearbox and a control unit in communication with the electric machine and configured to modify a torque output of the electric machine to compensate for variations in road grade and vehicle mass during a transmission engagement.

In a further non-limiting embodiment of the foregoing vehicle system, a torque converter is disposed between the electric machine and the transmission gearbox.

In a further non-limiting embodiment of either of the foregoing vehicle systems, a transmission pump is pressurized by the electric machine.

In a further non-limiting embodiment of any of the foregoing vehicle systems, the control unit is configured to estimate loads present during the transmission engagement and compensate for the estimated loads by modifying the torque output.

In a further non-limiting embodiment of any of the foregoing vehicle systems, a shift device actuates the transmission engagement when moved from a neutral gear to a drive gear.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system and method for controlling the torque delivery of an electric machine based on estimated loads present during a transmission engagement. The vehicle system computes a road grade estimate and a vehicle mass estimate. These estimates are used to derive torque compensation values which are added to other expected torque loads to calculate a feed-forward torque. The feed-forward torque is merged with a feedback torque, or torque adjustment, to compensate for variations in grade or mass during the transmission engagement. The vehicle system may control torque output whether the transmission input shaft is spinning or stationary at engagement. These and other features are discussed in greater detail below.

Figure 1:
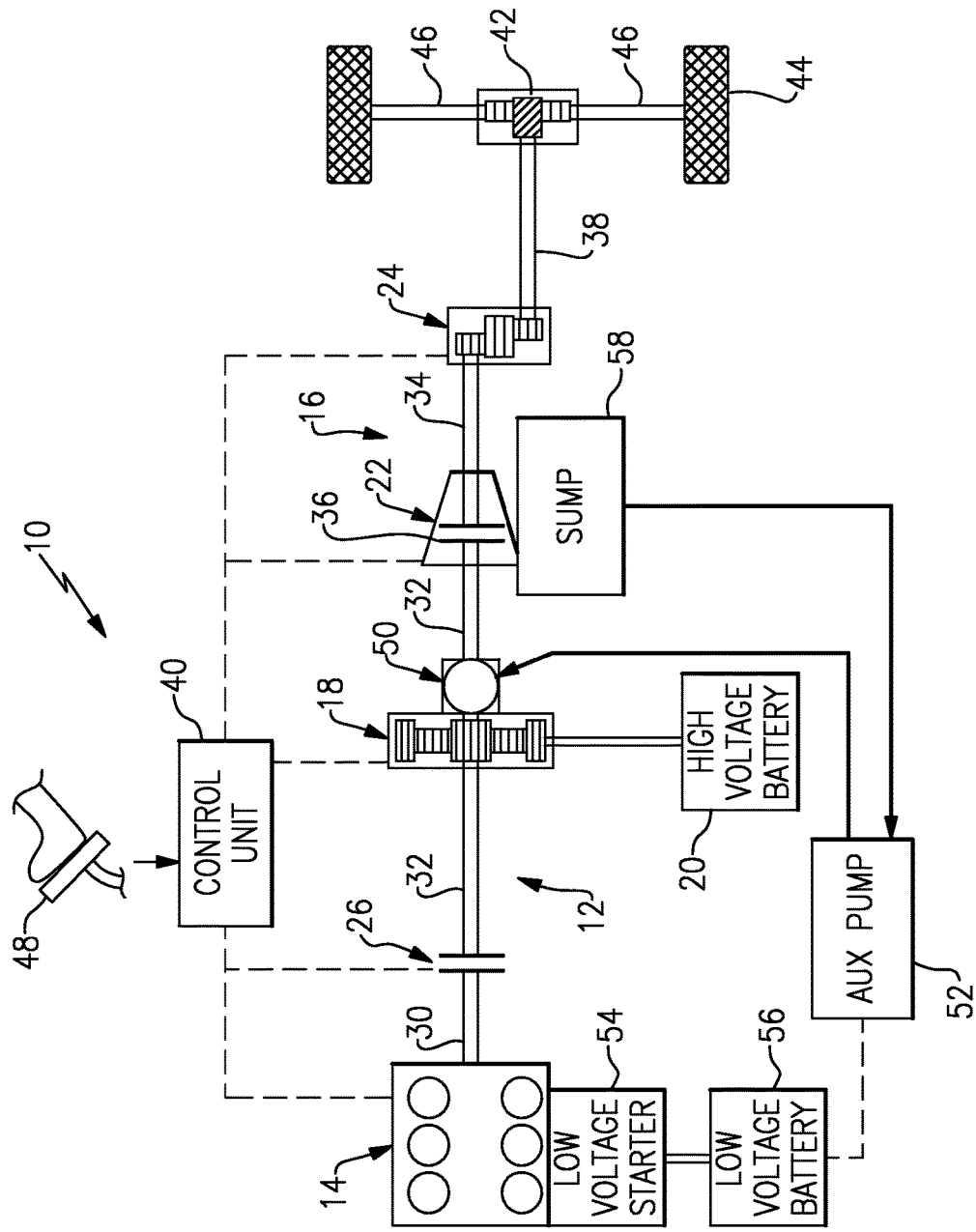
FIG. 1 schematically illustrates a powertrain of an electrified vehicle.

FIG. 1 schematically illustrates an electrified vehicle 10. Although illustrated as a hybrid electric vehicle (HEV) in some embodiments, the present disclosure may be applicable to other types of electrified vehicles. In addition, although a specific component relationship is illustrated in FIG. 1, this illustration is not intended to limit this disclosure. In other words, it should be readily understood that the placement and orientation of the various components of the electrified vehicle 10 could vary within the scope of this disclosure.

The exemplary electrified vehicle 10 includes a powertrain 12. The powertrain 12 includes an engine 14 and a transmission system 16 that is selectively driven by the engine 14. In one embodiment, the transmission system 16 is a modular hybrid transmission (MHT). The transmission system 16 can include an electric machine 18 powered by a high voltage battery 20, a torque converter 22, and a multiple-step ratio automatic transmission, or gearbox 24. In one embodiment, the electric machine 18 is configured as an electric motor. However, the electric machine 18 could alternatively be configured as a generator or a combined motor/generator within the scope of this disclosure.

The engine 14 and the electric machine 18 may both be employed as available drive sources for the electrified vehicle 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is engaged.

In some embodiments, the engine 14 is started using the electric machine 18 to rotate the engine 14 using torque provided through the engine disconnect clutch 26. Alternatively, the electrified vehicle 10 may be equipped with a low voltage starter 54 operatively connected to the engine 14, for example, through a belt or gear drive. The starter 54 may be used to provide torque to start the engine 14 without the addition of torque from the electric machine 18. The starter 54 may be powered by the high voltage battery 20, or the electrified vehicle 10 can include a low voltage battery 56 to provide power to the starter 54 and/or other vehicle components.

The electric machine 18 may be any one of a plurality of types of electric machines. By way of one non-limiting embodiment, the electric machine 18 could be a permanent magnet synchronous motor.

When the engine disconnect clutch 26 is at least partially engaged, power flow from the engine 14 to the electric machine 18 or from the electric machine 18 to the engine 14 is possible. For example, the engine disconnect clutch 26 may be engaged and the electric machine 18 may operate as a generator to convert rotational energy provided by a crankshaft 30 and an electric machine shaft 32 into electrical energy to be stored in the battery 20. The engine disconnect clutch 26 can also be disengaged to isolate the engine 14 from the remainder of the powertrain 12 such that the electric machine 18 can act as the sole power source for propelling the electrified vehicle 10.

The electric machine shaft 32 may extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with a torque converter 22 is but one non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 drives a pair of wheels 44 via respective axles 46 that are connected to the differential 42. In one embodiment, the differential 42 transmits approximately equal torque to each wheel 44 while permitting slight speed differences such as when the vehicle turns a corner. Different types of differentials or similar devices may be used to distribute torque from the powertrain 12 to one or more wheels 44. In some applications, torque distribution may vary depending on the particular operating mode or condition, for example.

Pressurized fluid for the transmission system 16 may be provided by a transmission pump 50. The transmission pump 50 may be connected to or adjacent to the electric machine 18 such that it rotates with the electric machine 18 and the electric machine shaft 32 to pressurize and provide sufficient line pressure for full operation of the transmission gearbox 24. When the portion of the electric machine shaft 32 containing the transmission pump 50 is at rest, the transmission pump 50 is also at rest and is inactive.

In order to provide pressurized transmission fluid when the transmission pump 50 is inactive, an auxiliary pump 52 can also be provided. The auxiliary pump 52 may be electrically powered, for example by the low voltage battery 56. In some embodiments, the auxiliary pump 52 provides a portion of the transmission fluid for the transmission gearbox 24 such that the transmission gearbox 24 is limited in operation, for example to certain actuators or gearing ratios, when the auxiliary pump 52 is operating.

Cooled transmission fluid, such as oil, may settle in a sump 58 from the torque converter 22. The auxiliary pump 52 may pump transmission fluid from the sump 58 to the transmission pump 50 during certain conditions.

The powertrain 12 may additionally include an associated control unit 40. While schematically illustrated as a single controller, the control unit 40 may be part of a larger control system and may be controlled by various other controllers throughout the electrified vehicle 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the battery 20, selecting or scheduling transmission shifts, actuating the engine disconnect clutch 26, etc. In one embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control unit 40 may communicate signals to and/or from the engine 14, the engine disconnect clutch 26, the electric machine 18, the torque converter bypass clutch 36, the transmission gearbox 24, and/or other components. Although not explicitly illustrated, those of ordinary skill in the art will recognize various functions or components that may be controlled by the control unit within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the electrified vehicle 10 to provide a demanded torque, power, or drive command to propel the electrified vehicle 10. In general, depressing and releasing the accelerator pedal 48 generates an accelerator pedal position signal that may be interpreted by the control unit 40 as a demand for increased power or decreased power, respectively. Based at least upon input from the accelerator pedal 48, the control unit 40 commands torque from the engine 14 and/or the electric machine 18. The control unit 40 also controls the timing of gear shifts within the transmission gearbox 24, as well as engagement or disengagement of the engine disconnect clutch 26 and the torque converter bypass clutch 36. Like the engine disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the electrified vehicle 10 with the engine 14, the engine disconnect clutch 26 is at least partially engaged to transfer at least a portion of the engine torque through the engine disconnect clutch 26 to the electric machine 18, and then from the electric machine 18 through the torque converter 22 and the transmission gearbox 24. The electric machine 18 may assist the engine 14 by providing additional power to turn the electric machine shaft 32. This operation mode may be referred to as a "hybrid mode" or an "electric assist mode."

To drive the electrified vehicle 10 using the electric machine 18 as the sole power source, the power flow remains the same except the engine disconnect clutch 26 isolates the engine 14 from the remainder of the powertrain 12. Combustion in the engine 14 may be disabled or otherwise turned OFF during this time to conserve fuel. The power electronics (not shown) may convert DC voltage from the battery 20 into AC voltage to be used by the electric machine 18. The control unit 40 commands the power electronics to convert voltage from the battery 20 to an AC voltage provided to the electric machine 18 to provide positive or negative torque to the electric machine shaft 32. This operation mode may be referred to as an "electric only" or "EV" operation mode.

In any mode of operation, the electric machine 18 may act as a motor and provide a driving force for the powertrain 12. Alternatively, the electric machine 18 could act as a generator and convert kinetic energy from the electrified vehicle 10 into electric energy to be stored in the battery 20. The electric machine 18 may act as a generator while the engine 14 is providing propulsion power for the electrified vehicle 10, for example. The electric machine 18 may additionally act as a generator during times of regenerative braking in which rotational energy from spinning the wheels 44 is transferred back through the transmission gearbox 24 and is converted into electrical energy for storage in the battery 20.

It should be understood that highly schematic depiction of FIG. 1 is merely exemplary and is not intended to be limiting on this disclosure. Other configurations are additionally or alternatively contemplated.

Figure 2:
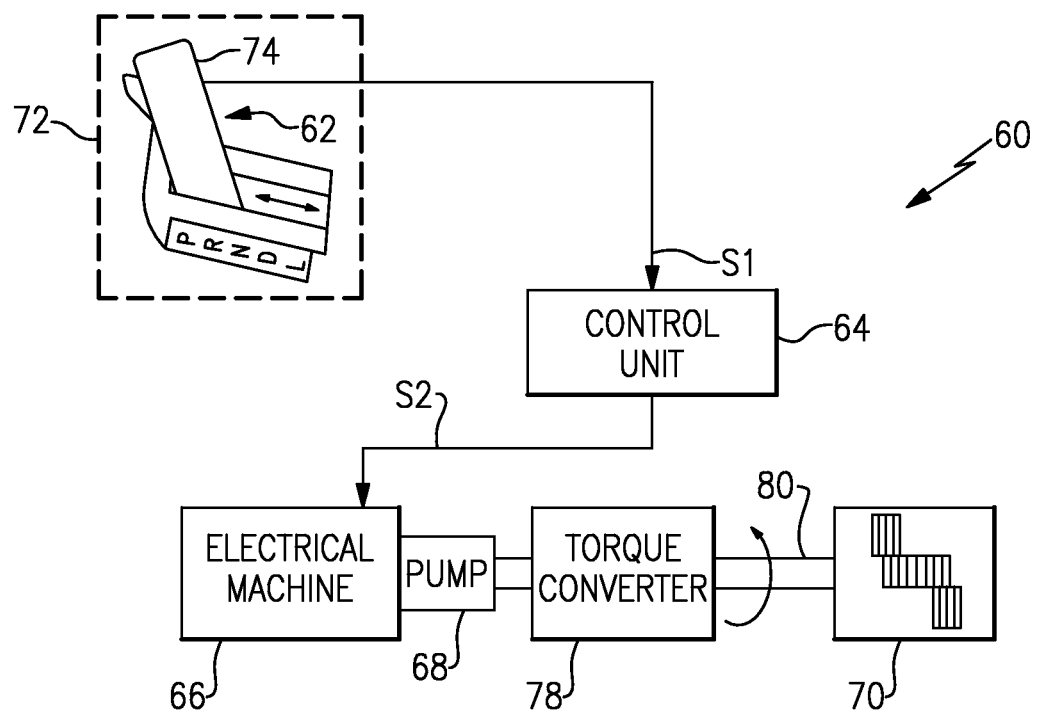
FIG. 2 illustrates a vehicle system of an electrified vehicle.

FIG. 2 illustrates a vehicle system 60 that may be incorporated into an electrified vehicle, such as the electrified vehicle 10 of FIG. 1 or any other electrified vehicle. The vehicle system 60 is adapted to estimate loads present during transmission engagements, and to compensate for these loads at the time of the engagement, whether or not a transmission input shaft is spinning or stationary, in order to execute a smooth engagement with minimal speed fluctuation of the input shaft.

In one non-limiting embodiment, the exemplary vehicle system 60 includes a shift device 62, a control unit 64, an electric machine 66, a transmission pump 68, a torque converter 78, and a transmission gearbox 70. The shift device 62 may be located within a passenger compartment 72 (shown schematically) located onboard a vehicle and is generally used to change a gear of the transmission gearbox 70. The shift device 62 may be a gear shift lever that includes a movable handle 74. However, in another non-limiting embodiment, the shift device 62 could include an electronic shift device that includes one or more joy sticks, dials and/or buttons.

The shift device 62 is in communication with the control unit 64. The control unit 64 may be part of an overall vehicle control unit, such as the control unit 40 of FIG. 1, or could alternatively be a stand-alone control unit separate from the control unit 40, or a plurality of control units communicating with one another. When the shift device 62 is moved from a neutral gear (e.g., Park or Neutral) to a drive gear (e.g., Drive, Reverse, Low, etc.), a shift signal S1 can be communicated to the control unit 64 indicating that engagement of one of the gears of the transmission gearbox 70 is desired.

The control unit 64 may communicate a torque request signal S2 to the electric machine 66 in response to receiving the signal S1. The torque request signal S2 commands the electric machine 66 to provide a torque output sufficient to power the torque converter 78, and thus spin an input shaft 80 of the transmission gearbox 70 at a desired torque. In one embodiment, the electric machine 66 is an electric motor. Spinning the input shaft 80 pressurizes the transmission pump 68 such that it can communicate a sufficient amount of transmission fluid to the clutches, gears and other components of the transmission gearbox 70. As discussed in greater detail below, the torque output of the electric machine 66 may be controlled (i.e., increased or decreased) during engagements of the transmission gearbox 70 to compensate for various loads that may be present during the engagement.

Figure 3:
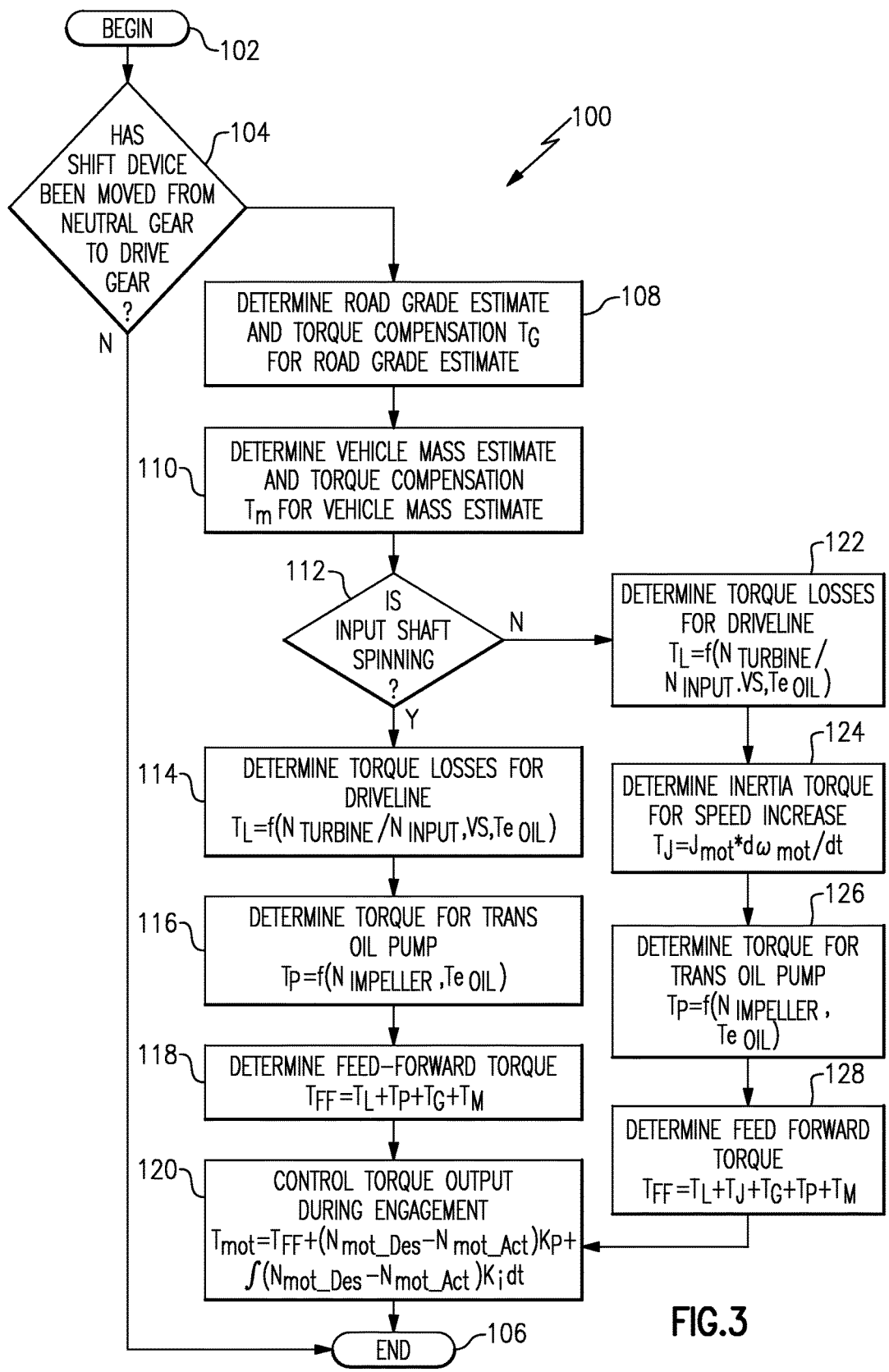
FIG. 3 schematically illustrates a vehicle control strategy for controlling the torque output of an electric machine based on estimated loads present during a transmission engagement.

FIG. 3, with continued reference to FIGS. 1 and 2, schematically illustrates a vehicle control strategy 100 of an electrified vehicle 10 that is equipped with the vehicle system 60 described above. The exemplary vehicle control strategy 100 may be performed to estimate and compensate for various loads present during a transmission engagement. For example, the vehicle control strategy 100 can compensate for variations in road grade or vehicle mass by adjusting the torque output accordingly. Of course, the vehicle system 60 is capable of implementing and executing other control strategies within the scope of this disclosure. In one embodiment, the control unit 64 of the vehicle system 60 may be programmed with one or more algorithms adapted to execute the vehicle control strategy 100, or any other control strategy.

As shown in FIG. 3, the vehicle control strategy 100 begins at block 102. At block 104, the vehicle system 60 determines whether the shift device 62 has been moved from a neutral gear to a drive gear. If the shift device has not been moved from a neutral gear to a drive gear, the vehicle control strategy 100 ends at block 106. However, if the shift device has been moved from a neutral gear to a drive gear, indicating that a transmission engagement is likely, then the vehicle control strategy 100 may proceed to block 108.

At block 108, the vehicle system 60 determines a road grade estimate and a torque compensation value $T_G$ that can be derived from the road grade estimate. The road grade estimate is a part of the load present during a transmission engagement and may be estimated using any known road grade estimation technique. In one non-limiting embodiment, the road grade estimate may be calculated based on the relationship between one or more of vehicle speed, vehicle acceleration, yaw rate, wheel torques, vehicle mass, drag forces, etc. The torque compensation value $T_G$ represents the amount of torque the electric machine 66 must additionally output to compensate for the road grade estimate.

Similarly, at block 110, the vehicle system 60 determines a vehicle mass estimate and a torque compensation value $T_M$ that can be derived from the vehicle mass estimate. The vehicle mass estimate is another portion of the load present during a transmission engagement and may be estimated using any known vehicle mass estimation technique. In one non-limiting embodiment, the vehicle mass estimate may be calculated based on the relationship between one or more of longitudinal acceleration, wheel torques, vehicle speed, yaw rate, longitudinal acceleration, etc. The torque compensation value $T_M$ represents the amount of torque the electric machine 66 must additionally output to compensate for the vehicle mass estimate.

The road grade estimate and the vehicle mass estimate may be calculated using a variety of methodologies. Non-limiting examples of suitable methodologies for determining road grade estimates and/or vehicle mass estimates are described in U.S. Patent Application Publication No. 2014/0067154, U.S. Patent Application Publication No. 2014/0067240, and U.S. Pat. No. 8,793,035, the disclosures of which are incorporated herein by reference.

Next, at block 112, the vehicle system 60 determines whether the input shaft 80 of the transmission gearbox 70 is spinning. If the input shaft 80 is spinning, the vehicle control strategy 100 proceeds to block 114. However, if the input shaft 80 is stationary, the vehicle control strategy 100 may proceed to block 122.

If the input shaft 80 is determined to be spinning at block 112, the vehicle system 60 may determine torque compensation values associated with various additional loads that may be present during a transmission engagement at blocks 114 to 116. For example, at block 114, a torque compensation value $T_L$ may be calculated that is derived from driveline losses. The torque compensation value $T_L$ represents the additional amount of torque the electric machine 66 must output to compensate for any driveline losses. In one embodiment, as illustrated by equation (1), the torque compensation value $T_L$ may be a function of the speed of the turbine of the torque converter 78 ($N_{Turbine}$), the speed of the input shaft 80 ($N_{Input}$), the speed of the electrified vehicle 10 (VS) and the transmission fluid temperature of the transmission gearbox 70 ($Te_{oil}$):

$$T_L = f(N_{Turbine}, N_{Input}, VS, Te_{oil}) \quad (1)$$

Another torque compensation value $T_P$ may be calculated based on loads of the transmission pump 68 at block 116. The torque compensation value $T_P$ represents the amount of torque the electric machine 66 must additionally output to compensate for the loads of the transmission pump 68. In one non-limiting embodiment, as illustrated by equation (2), the torque compensation value $T_P$ may be a function of the speed of the impeller of the torque converter 78 ($N_{Turbine}$) and the transmission fluid temperature of the transmission gearbox 70 ($Te_{oil}$):

$$T_P = f(N_{Impeller}, Te_{oil}) \quad (2)$$

A feed-forward torque $T_{FF}$ may be calculated at block 118 by adding together each torque compensation value associated with each load that is present during a transmission engagement. The feed-forward torque $T_{FF}$ is a pre-determined torque or "starting point" that is based upon the road-load and various losses associated with the electrified vehicle 10. The following equation is representative of the feed-forward torque $T_{FF}$ calculation:

$$T_{FF} = T_L + T_P + T_G + T_M \quad (3)$$

The control unit 64 of the vehicle system 60 may command a torque output $T_{EM}$ of the electric machine 66 at block 120. The torque output $T_{EM}$ may be derived from the feed-forward torque $T_{FF}$ and a feedback torque. The feedback torque is an adjustment torque that attempts to maintain a smooth speed profile of the electric machine 66 during the transmission engagement. The torque output $T_{EM}$ may be derived using the following equation:

$$T_{EM} = T_{FF} + (N_{EM\_des} - N_{EM\_act})K_P + \int(N_{EM\_des} - N_{EM\_act}) K_i dt \quad (4)$$

where:
$N_{EM\_des}$ is the desired speed of the electric machine;
$N_{EM\_act}$ is the actual speed of the electric machine;
$K_P$ is a proportional gain; and
$K_i$ is an integral gain.

Even if the input shaft 80 is determined to be stationary at block 112, the vehicle system 60 still determines torque compensation values associated with various loads that may be present during a transmission engagement at blocks 122 to 126. For example, a torque compensation value $T_L$ may be calculated based on driveline losses at block 122 (similar to block 114) and a torque compensation value $T_P$ may be calculated based on loads of the transmission pump 68 at block 126 (similar to block 116). Another torque compensation value $T_J$ may be determined at block 124 and is based on the inertia required to spin up the input shaft 80 since it is stationary in this example. The torque compensation value $T_J$ represents the additional amount of torque the electric machine 66 must output to compensate for the inertia required to spin up the input shaft 80. In one non-limiting embodiment, as illustrated by equation (5), the torque compensation value $T_J$ may be based on the inertia of the electric machine 66 ($J_{EM}$) and a speed change on the input shaft 80 over time ($\omega_{EM}$):

$$T_J = J_{EM} * d\omega_{EM}/dt \quad (5)$$

The feed-forward torque $T_{FF}$ may then be calculated at block 128, and the torque output $T_{EM}$ may be calculated and commanded at block 120. The vehicle control strategy 100 then ends at block 106.

Figure 4:
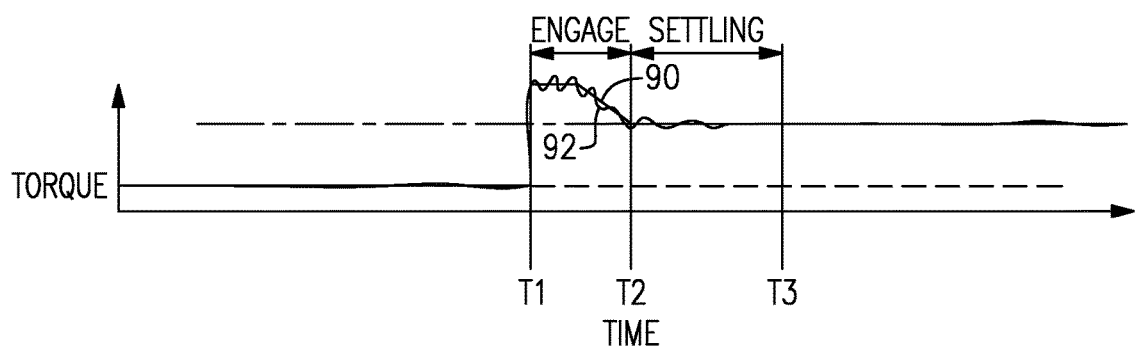
FIG. 4 graphically illustrates electric machine torque over time.

FIG. 4 schematically illustrates a plot of Torque versus Time of the electric machine 66 of the vehicle system 60. A transmission engagement begins at a time T1. A feed-forward torque 90 compensates for expected changes in the engagement loads. A feedback torque 92 has considerably less work to do between times T1 and T2 to compensate for any sudden changes in load at time T1 during the transmission engagement. The input speed of the electric machine 66 settles to the target speed faster, resulting in less ringing in the driveline between times T2 and T3.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling a torque output of an electric machine of an electrified vehicle based on estimated loads present during a transmission engagement of the electrified vehicle, the controlling step is performed each time a shift device is moved from a neutral gear to a drive gear, and wherein the estimated loads are based on at least a road grade estimate, a vehicle mass estimate, driveline loads, and transmission pump loads.

2. The method as recited in claim 1, wherein the controlling step includes determining whether an input shaft of a transmission gearbox is spinning or stationary as the transmission engagement is initiated.

3. The method as recited in claim 1, wherein the estimated loads are based on an amount of inertia necessary to spin up an input shaft of a transmission gearbox.

4. The method as recited in claim 1, wherein the controlling step includes:
estimating the loads present during the transmission engagement; and
adjusting the torque output of the electric machine to compensate for the estimated loads.

5. The method as recited in claim 1, wherein the controlling step includes:
determining the road grade estimate; and
deriving a first torque compensation value from the road grade estimate.

6. The method as recited in claim 5, wherein the controlling step includes:
determining the vehicle mass estimate; and
deriving a second torque compensation value from the vehicle mass estimate.

7. The method as recited in claim 6, comprising deriving a third torque compensation value from the driveline loads and a fourth torque compensation value from the transmission pump loads.

8. The method as recited in claim 7, comprising determining a feed-forward torque by adding the first torque compensation value, the second torque compensation value, the third torque compensation value and the fourth torque compensation value.

9. The method as recited in claim 8, wherein the controlling step includes modifying the torque output based on the feed-forward torque and a feedback torque.

10. The method as recited in claim 7, comprising deriving a fifth torque compensation value based on an amount of inertia required to spin up an input shaft of a transmission gearbox.

11. The method as recited in claim 10, comprising determining a feed-forward torque by adding the first torque compensation value, the second torque compensation value, the third torque compensation value, the fourth torque compensation value, and the fifth torque compensation value.

12. The method as recited in claim 11, wherein the controlling step includes modifying the torque output based on the feed-forward torque and a feedback torque.

13. The method as recited in claim 1, wherein the electrified vehicle is a modular hybrid transmission (MHT) vehicle.

14. A vehicle system, comprising:
a transmission gearbox;
an electric machine that supplies torque to an input shaft of said transmission gearbox;
a torque converter disposed between said electric machine and said transmission gearbox; and
a control unit in communication with said electric machine and configured to modify a torque output of said electric machine to compensate for variations in road grade and vehicle mass during a transmission engagement.

15. The vehicle system as recited in claim 14, comprising a transmission pump pressurized by said electric machine.

16. The vehicle system as recited in claim 14, wherein said control unit is configured to estimate loads present during said transmission engagement and compensate for said estimated loads by modifying said torque output.

17. The vehicle system as recited in claim 14, comprising a shift device that actuates said transmission engagement when moved from a neutral gear to a drive gear.

18. The vehicle system as recited in claim 14, wherein said control unit is configured to modify said torque output to additionally compensate for variations in driveline loads and transmission pump loads during the transmission engagement.

* * * * *